United States Patent [19]

Platt, III

[11] 4,364,311

[45] Dec. 21, 1982

[54] PRECISION TRIMMING AND PRECISION CROSS-CUTTING APPARATUS AND METHOD FOR BULK MATERIAL

[76] Inventor: James B. Platt, III, 12826 Dover Rd., Reisterstown, Md. 21136

[21] Appl. No.: 184,330

[22] Filed: Sep. 5, 1980

[51] Int. Cl.³ .............................................. B65B 27/10
[52] U.S. Cl. ......................................... 100/6; 83/158; 83/169; 83/171; 83/268; 83/419; 83/421; 83/423; 83/488; 100/26
[58] Field of Search ............... 100/6, 26; 53/522, 513; 83/160, 158, 169, 171, 207, 250, 253, 268, 278, 732, 419–421, 437, 488

[56] References Cited

U.S. PATENT DOCUMENTS

| | | | |
|---|---|---|---|
| 2,781,573 | 2/1957 | Espari et al. | 83/268 |
| 3,141,367 | 7/1964 | Keener et al. | 83/268 X |
| 3,811,353 | 5/1974 | Miles | 83/268 X |
| 3,870,774 | 3/1975 | Maroschak | 100/6 X |
| 3,871,288 | 3/1975 | White | 83/158 X |
| 4,128,119 | 12/1978 | Maier | 83/158 X |
| 4,210,184 | 7/1980 | McGriff | 83/169 X |

Primary Examiner—Frank T. Yost
Attorney, Agent, or Firm—Spencer & Kaye

[57] ABSTRACT

A method and apparatus for precision cutting a bundle of mill length lumber into a plurality of strapped and trimmed bundles of lumber of desired shorter length(s). The bundle of mill length lumber is placed on an elongated conveyor and moved longitudinally by means of an advancing moveable carriage until the leading edge of the bundle of lumber abuts a surface of a set work carriage positioned downstream of a circular saw which can selectively be advanced across the conveyor path. The ends of the bundle of lumber are then squared by advancing a ram on the moveable carriage. The squared bundle of lumber is banded or strapped by a banding apparatus disposed slightly upstream of the saw and thereafter the leading edge of the bundle of lumber is precision trimmed by advancing the saw across the conveyor path. After trimming, the setwork carriage is moved a distance away from the cutting plane of the saw corresponding to the desired length of cut lumber, the bundle of lumber is pushed along the conveyor path by means of the moveable carriage until its trimmed leading edge abuts the surface of the set work carriage, the bundle of lumber is again strapped by the banding apparatus and then precision cut by the saw, and the strapped bundle of lumber between the saw and the set work carriage is removed from the conveyor path in a transverse direction and preferably directly placed on a pallet. The advancing, strapping, cutting and removal steps are continued until the original bundle of mill length lumber has been cut into the desired number of strapped bundles of lumber of desired shorter length.

15 Claims, 9 Drawing Figures

PRECISION TRIMMING AND PRECISION CROSS-CUTTING APPARATUS AND METHOD FOR BULK MATERIAL

BACKGROUND OF THE INVENTION

The present invention relates to an apparatus for precision trimming and precision cutting elongated bulk, bundled or packaged material, in particular lumber, into desired lengths. More specifically, the present invention relates to an apparatus for precision trimming and precision cross cutting bundles of mill length lumber into one or more strapped or banded bundles of lumber of a desired length, without removing the lumber from its original mill packaged condition.

As is known, it is conventional for lumber mills to provide boards of a substantial length, e.g. 8 to 24 feet, which have been trimmed to a standard foot or sometimes a standard foot and inch measurements. In fact, however, the length of the boards vary, within limits, from the desired cut-process lengths. In order to use such long boards, it is necessary to either trim same to the indicated cut-process length, if a single board of this length is desired or, as is more usually the case, to cut the mill length board into a plurality of boards of desired shorter length or lengths.

In the presently used methods of cross cutting boards of long mill length into a plurality of boards of desired length or lengths, the long mill length boards are individually handled and cut so as to provide the desired shorter lengths. Such a procedure is obviously time consuming and costly, particularly due to the many hours of labor involved. Moreover, even more labor is required in order to sort and stack the cut length of lumber into separate packages which can thereafter be easily handled.

SUMMARY OF THE INVENTION

The present invention provides a novel apparatus and method for handling, precision trimming and precision cutting elongated material, particularly bulk or packaged long mill length lumber, into shorter lengths with a high rate of production and with a minimum of labor. More specifically, the present invention provides a novel apparatus and method of handling, precision trimming and precision cutting entire bundles of long length of lumber to provide a plurality of banded or strapped bundles of desired shorter process lengths of lumber which can easily be handled, for example, by a fork lift truck.

The novel apparatus provided accordingly to the invention for precision trimming and/or precision cutting elongated bulk or packaged material into desired lengths basically comprises an elongated infeed conveyor table for supporting the material to be trimmed and cut and for conveying the material along a path extending longitudinally of same; an elongated cutting table disposed adjacent one end of the conveyor table for receiving and supporting the material being conveyed; a power cutting means including a circular saw which is mounted for rotation about a substantially horizontal axis on a movable saw carriage, with the saw carriage being operable to move the circular saw transversely and across the cutting table to cut material in its path on the cutting table; a first substantially horizontal carriage mounted on the conveyor table for controlled reversible movement along same with the carriage having a first material engaging surface which extends across and substantially normal to the conveying path and which engages one end of the material so as to push same along the conveyor toward the cutting table; and a second substantially horizontal carriage which is mounted on the cutting table for controlled reversible movement along the conveying path on the downstream side of the circular saw, and which has a further material engaging surface extending across and substantially normal to the conveying path for engaging the opposite end of the material to act as a material stop so as to permit cutting of the material at a desired point.

According to further features of the invention, the elongated material is a strapped mill size bundle of lumber which is to be trimmed and cut into a plurality of bundles of shorter length and the apparatus is provided with various arrangements for aligning or squaring the bundle prior to trimming and cutting of same. In particular, the ends of the bundle are aligned by means of a controllable hydraulic piston or ram connected between the first carriage and its material engaging surface so as to move the first material engaging surface, under pressure and relative to the first carriage, against the adjacent end of the bundle of lumber. Moreover, to align or square the cross section of the bundle of lumber, the apparatus, in particular the conveyer table, is provided with vertically expanding bars or stops along the edges of same with at least one of these bars or stops being movable transverse to the longitudinal axis to align the cross section between the stop and the bar.

According to still a further feature of the invention, an arrangement is provided for removing the cut lengths of lumber between the saw and the second carrage in a direction transverse to the longitudinal axis of the cutting table and parallel to the plane of the saw. Moreover, when a bundle of lumber is being cut, according to a further feature of the invention, a strapping or banding arrangement is provided immediately adjacent the upstream side of the circular saw for tightly strapping or banding the bundle of lumber prior to cutting same with the saw. With this arrangement, the cut bundle of lumber of the desired length which is removed from the cutting table in the transverse direction will be a banded bundle or stack of lumber which can easily be handled.

Finally, accordingly to a further feature of the invention, the circular saw, which for example may have a diameter of 78 inches in order to be able to cut substantially large bundles of lumber, for example, 30 inches by 50 inches in cross section, is provided with a water guide which keeps the blade cool and prevents wandering of the blade during the cutting operation.

The novel method according to the invention basically comprises: placing a bundle of lumber on the conveyer table between the saw and the first carriage; moving the second carriage relative to the saw until the second material engaging surface is a desired distance from the saw; moving the first carriage toward the saw and against the bundle of lumber until the leading edge of the bundle of lumber abuts the second material engaging surface of the second carriage; moving the first material engaging surface relative to its carriage and toward the saw under pressure so as to align the ends of the bundle of lumber between the two material engaging surfaces; tightly banding or strapping the bundle of lumber; and advancing the saw carriage the cause to saw to cut the lumber.

The steps thus far recited basically are utilized to provide the precision trimming cut for the leading edge of the original bundle of lumber. Thereafter, in order to cut the original bundle of lumber into a plurality of strapped or banded bundles of a selected desired length, the second carriage is moved until the second material handling surface is a desired distance from the saw corresponding to the desired length of a cut bundle; the first carriage is advanced toward the saw so as to push the remainder of the original bundle of lumber toward the second material engaging surface until the cut leading edge of the bundle abuts same; the remaining portion or length of the bundle is again tightly strapped or banded; the saw carriage again advanced to cause the saw to cut thru the bundle of lumber; and the strapped cut bundle of lumber between the saw and the second material engaging surface, i.e. on the downstream side of the saw, is removed from the cutting table in a direction transverse to the longitudinal axis of the cutting table. The steps of advancing the first carriage toward the saw, so as to move the bundle of lumber along the conveyer, the strapping of the remaining length of the bundle of lumber, and the cutting of same with the saw and the removal of the strapped cut bundle of lumber are repeated as necessary until the original bundle of lumber has been cut into the desired number of strapped bundles of desired shorter length.

DETAILED DESCRIPTION OF THE PREFERRED EMBODIMENTS

Figure 1:
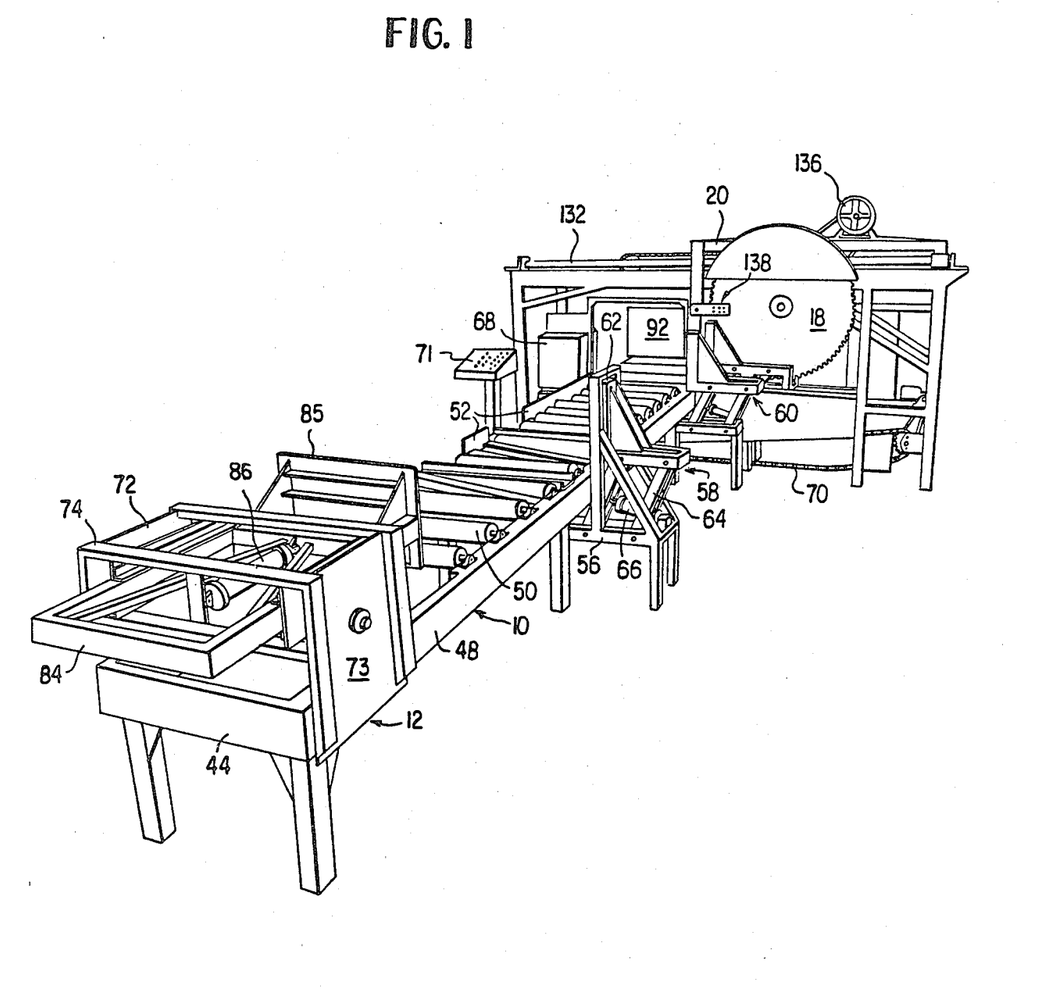
FIG. 1 is a perspective view of the preferred embodiment of the apparatus according to the invention.
Figure 2:
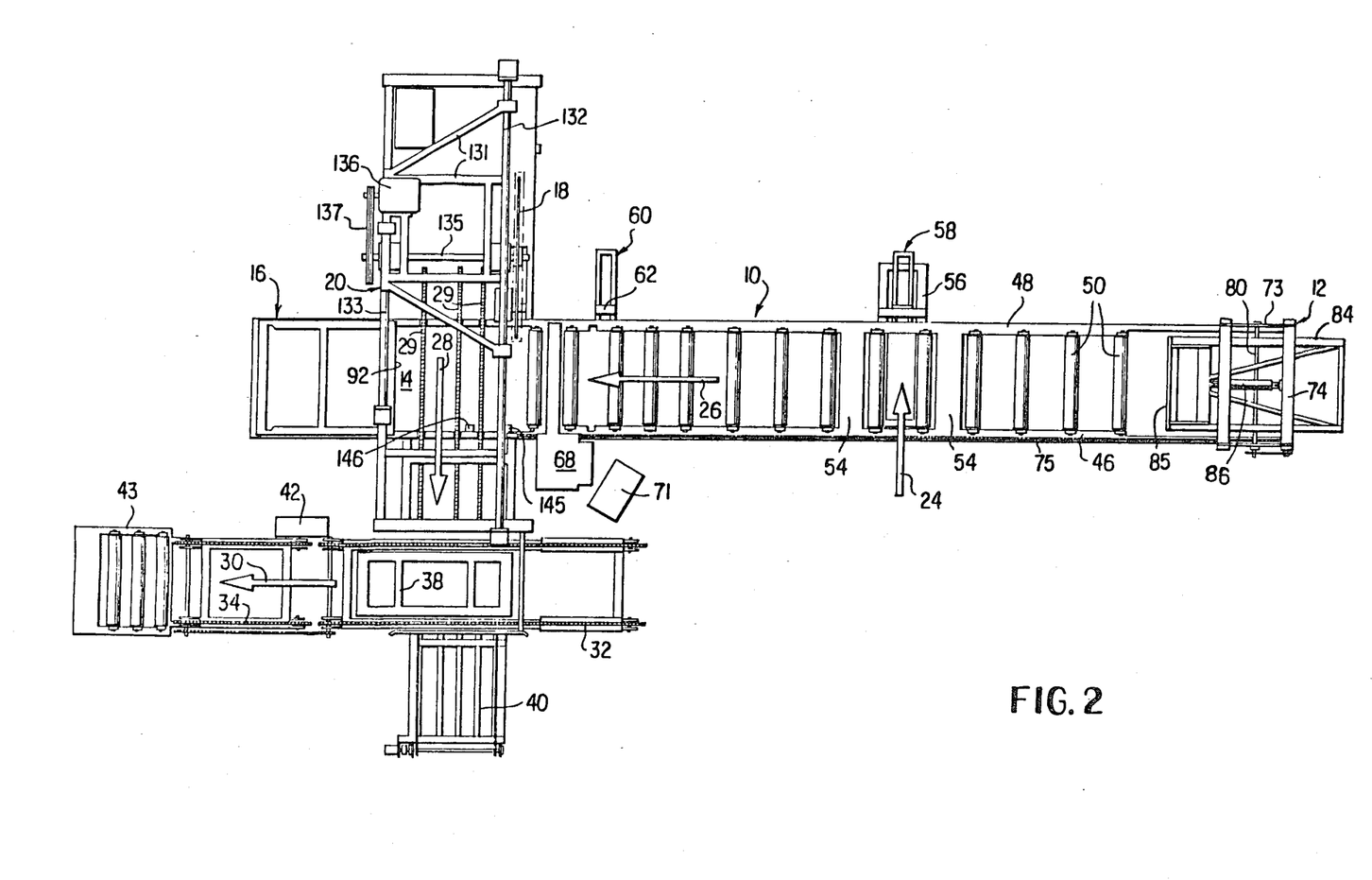
FIG. 2 is a schematic plan view of the preferred embodiment of the apparatus according to the invention.
Figures 3, 9:
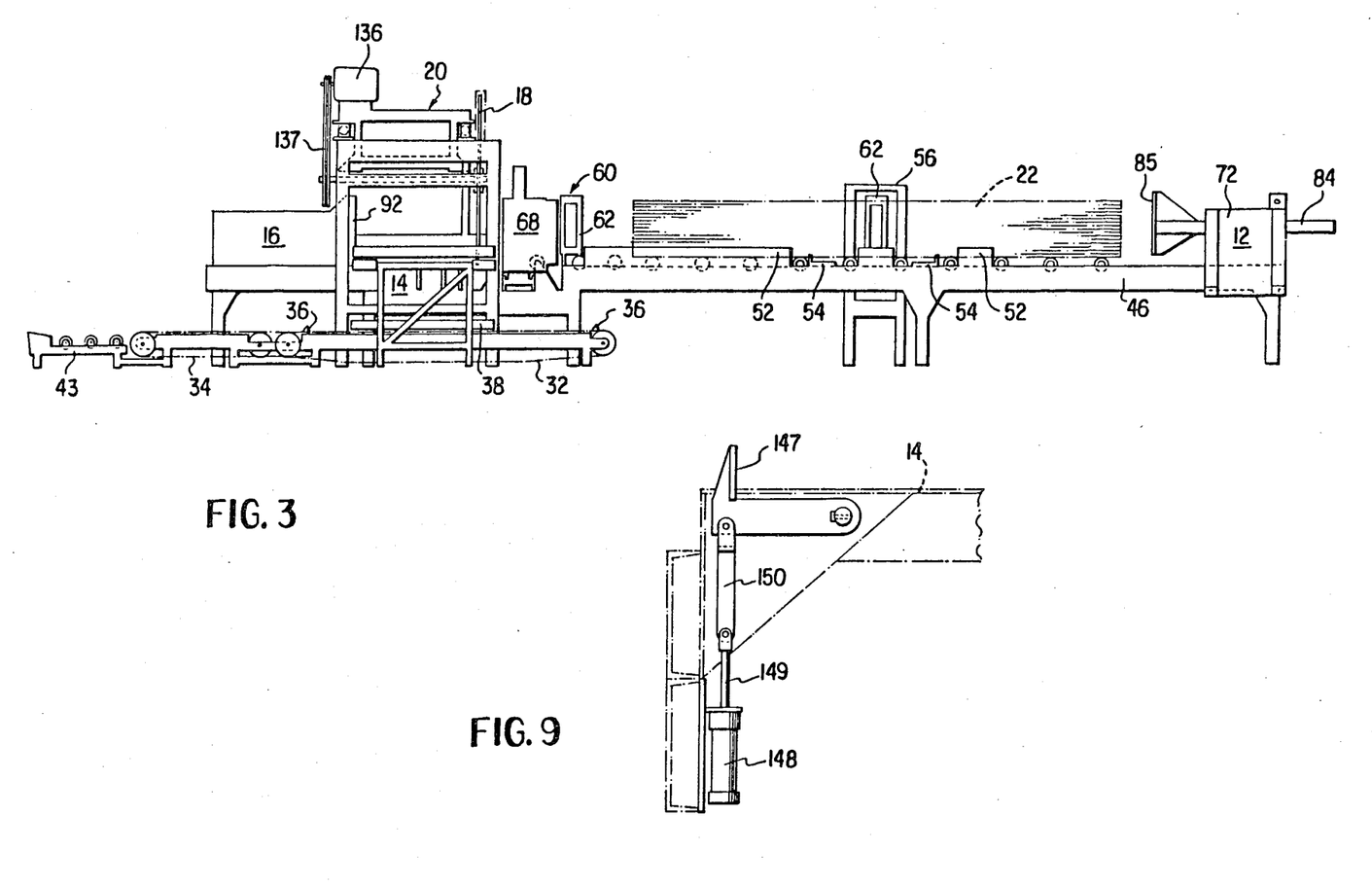
FIG. 3 is a schematic elevation view of the preferred embodiment of the apparatus according to the invention.
FIG. 9 is a sectional view along the line 9—9 of FIG. 5 showing the cut bundle stop assembly.

Referring now to FIGS. 1-3, there is shown a preferred embodiment of the apparatus according to the invention which, although it could be utilized for trimming and/or cross cutting long lengths of material into one or more pieces of a desired shorter length or lengths, is particularly intended for the trimming and cutting of strapped or banded bundles of lumber of mill length into a plurality of strapped or banded bundles of desired selected shorter length or lengths. The preferred embodiment of the apparatus generally includes an elongated horizontal in-feed conveyor table 10 having a horizontal squaring or pushing carriage 12 mounted on same for controlled horizontal movement along the surface of the conveyor table 10 in the longitudinal direction; an elongated cutting table 14 positioned adjacent the downstream end of the conveyor table 10 and with the surface of the cutting table 14 being substantially coplanar with the surface of the conveyor table 10 in order to receive material being conveyed by the conveyor table 10; a further horizontal carriage 16 which is slidably mounted on the surface of the cutting table 14 at its downstream end for controllable reversible movement along the longitudinal axis of the cutting table 14 and which serves as a precision workstop for the material on the cutting table 14; and a power driven circular saw 18 mounted on a saw carriage 20 for selectively moving the saw 18 across the surface of the cutting table 14 in a direction transverse to the longitudinal axis of same so a to cross-cut any material in its path on the cutting table 14.

In its general mode of operation, the material to be cut, preferably a bundle of long mill length lumber, for example a rectangular bundle of lumber 30 inches high by 50 inches wide by 20 feet long, as indicated by the reference numeral 22 in FIG. 3, is placed on the surface of the conveyor table 10 in a direction transverse to the longitudinal axis of same, as indicated generally by the arrow 24 in FIG. 2. The bundle of lumber 22 is then pushed along the surface of the conveyor table 10 in the direction of its longitudinal axis, as indicated by the arrow 26 of FIG. 2, by advancing the squaring or pushing carriage 12 until the leading or left hand end of the bundle of lumber 22 abuts the carriage 16, which has been previously set along the surface of the cutting table 14 at a desired distance from the cutting plane of the saw 18 corresponding to the length of the material which is to be cut from the bundle of lumber 22. After cutting, the material cut from the bundle of lumber 22 is removed from the surface of the cutting table 14 in a direction transverse to the longitudinal axis of same, as indicated by the arrow 28, by means of a pusher mechanism which will be more fully described below.

Preferably, the material being removed from the cutting table 14 is to be directly placed on a pallet (not shown) which is then conveyed from the area of the cutting table in the direction of the arrow 30 of FIG. 2. For this purpose, there is generally provided a pair of adjacent power driven chain conveyors 32 and 34, with the chains of the conveyor 32 being provided with laterally extending projections 36, a pallet elevator 38, and a transverse slide carriage 40, which is disposed substantially at the height of the surface of the cutting table 14. In operation of this palletizing arrangement, motor 42 for driving the chain conveyors 32 and 34 is selectively energized to cause the projections 36 to engage a pallet placed on the upper surface of the conveyor 32 at its right hand end and move the pallet onto the surface of the pallet elevator 38, which is then raised to bring the upper surface of the pallet to the desired height. When transfer of material from the surface of the cutting table 14 to the pallet is desired, the slide carriage 40 is extended over the surface of the pallet, the material is pushed from the surface of the cutting table 14 onto the surface of the slide carriage 40 which is then withdrawn so as to deposit the cut material onto the surface of the pallet. Thereafter, the elevator 38 is lowered and the chain conveyors 32 and 34 are energized to move the loaded pallet in the direction of the arrow 30 to roller table 43, and to bring a new pallet into position over the pallet elevator 38. Thereafter, the loaded pallet may be moved by means of a forklift truck for further handling.

Turning now to a more detailed description of the apparatus and method according to the invention, the conveyor table 10 as shown in FIGS. 1-3, includes a horizontal elongated stationary frame 44 having a pair of laterally spaced parallel side rails 46,48. Journalled by their respective ends in the side rails 46 and 48 are a plurality of elongated rollers 50 whose longitudinal axes all lie in a single substantially horizontal plane. Extending vertically upward from one to the side rails, and in particular the side rail 46 on the side of the conveyor table 10 from which material is fed onto the table 10, are a plurality of stationary stops or aligning members 52 whose surfaces facing the rollers 50 all lie in a vertical plane substantially normal to the cutting plane of the saw 18. It should be noted that although it is possible to utilize only a single continuous aligning stop 52, preferably a plurality of stops as illustrated are utilized in order to permit loading of the material to be cut, for example, a bundle of lumber 22, onto the conveyor table 10 by means of a forklift truck. For this purpose, in the spaces between the stops 52, the conveyor table 10 is provided with a pair of channels 54 which are fastened to the two side rails 46 and 48 and extend between respective pairs of adjacent rollers 50. The lateral spacing of the channels 54 corresponds to that of the tines of a forklift truck. Consequently, by inserting the tines of a forklift truck in the channels 54, the longitudinal axis of a bundle of lumber 22 would be essentially parallel to the longitudinal axis of the conveyor table 10, and the tines can easily be removed once they are lowered sufficiently so that the bundle of lumber 22 rests on the rollers 50. In order to ensure that any bundle of lumber 22 placed onto the conveyor table 10 in the direction of the arrow 24 of FIG. 2 does not extend over the edge of the table, an upwardly extending vertical backstop frame 56 is provided adjacent to side rail 48 and substantially symetrically disposed between the channels 54. Consequently, any bundle of lumber 22 placed on the surface of the conveyor table 10 by means of a forklift truck will, at least to some extent, have its cross section aligned by coming into contact with the backstop 56.

Disposed adjacent the side rail 48 of the conveyor table frame 44 are a pair of laterally spaced crowder mechanisms 58, 60 with the crowder mechanism 58 being disposed at the locus of the backstop 56 and the crowder mechanism 60 being disposed closer to the saw carriage 20. Each of the crowder mechanisms 58, 60 basically includes a vertically extending member 62 mounted on a parallelagram linkage type member 64 for movement across and transverse to the longitudinal axis of the conveyor table 10. Each of the crowder mechanisms 58, and 60 is provided with a respective hydraulic piston mechanism 66, energization of which will cause the same to move the associated vertical member 62 under pressure in a direction transverse to the longitudinal axis of the table 10 against the side of any bundle of lumber 22 disposed on the surface of the table 10. As can easily be appreciated, the pressure exerted by the advancing crowder mechanism 58 or 60 against the side of a bundle of lumber 22 on the surface of the table 10, will not only push the bundle of lumber 22 transversely until it abuts the stops 52, and thus be properly aligned for cutting by the saw 18, but moreover tends to align or square the cross section of the bundle of lumber 22. Moving of the bundle of lumber against the stops 52 likewise aligns same for banding or strapping by a banding apparatus 68 disposed adjacent the side rail 46 between the vertical plane of the crowder mechanism 60 and the vertical or cutting plane of the saw 18. The banding or strapping apparatus 68 may be of conventional design, for example, a Signode model M22OHG power strapping machine, which is preferably disposed so that it can strap or band a bundle of lumber 22 at a longitudinal distance of approximately 1½ to 2 feet from the cutting plane of the saw 18. It should be noted that, as will become clear from the discussion of the method according to the invention to be described below, the distance between the plane of the saw 18 and the bander 68 determines the minimum length of the last or final banded bundle of lumber which can be cut from the original banded bundle of lumber 22. That is, the distance between the plane of the saw 18 and the carriage 16 at the time the final cut or trimming of the trailing edge of the bundle 22 is made cannot be less than the distance between the plane of the saw 18 and the bander 68.

Finally, FIG. 1 generally shows a chain or belt conveyor 70, which is positioned below the path of the saw 18 during its cutting movement, to convey scrap material trimmed from the two ends of the bundle of lumber 22, as well as the sawdust, to a collection bin (not shown). Moreover, a control console 71 for controlling the operation and movement of the various mechanisms of the preferred embodiment of the invention is provided at a convenient location whereby an operator can observe what is occurring in the various portions of the apparatus. In this manner, a entire apparatus can be operated by the single operator.

Figure 4:
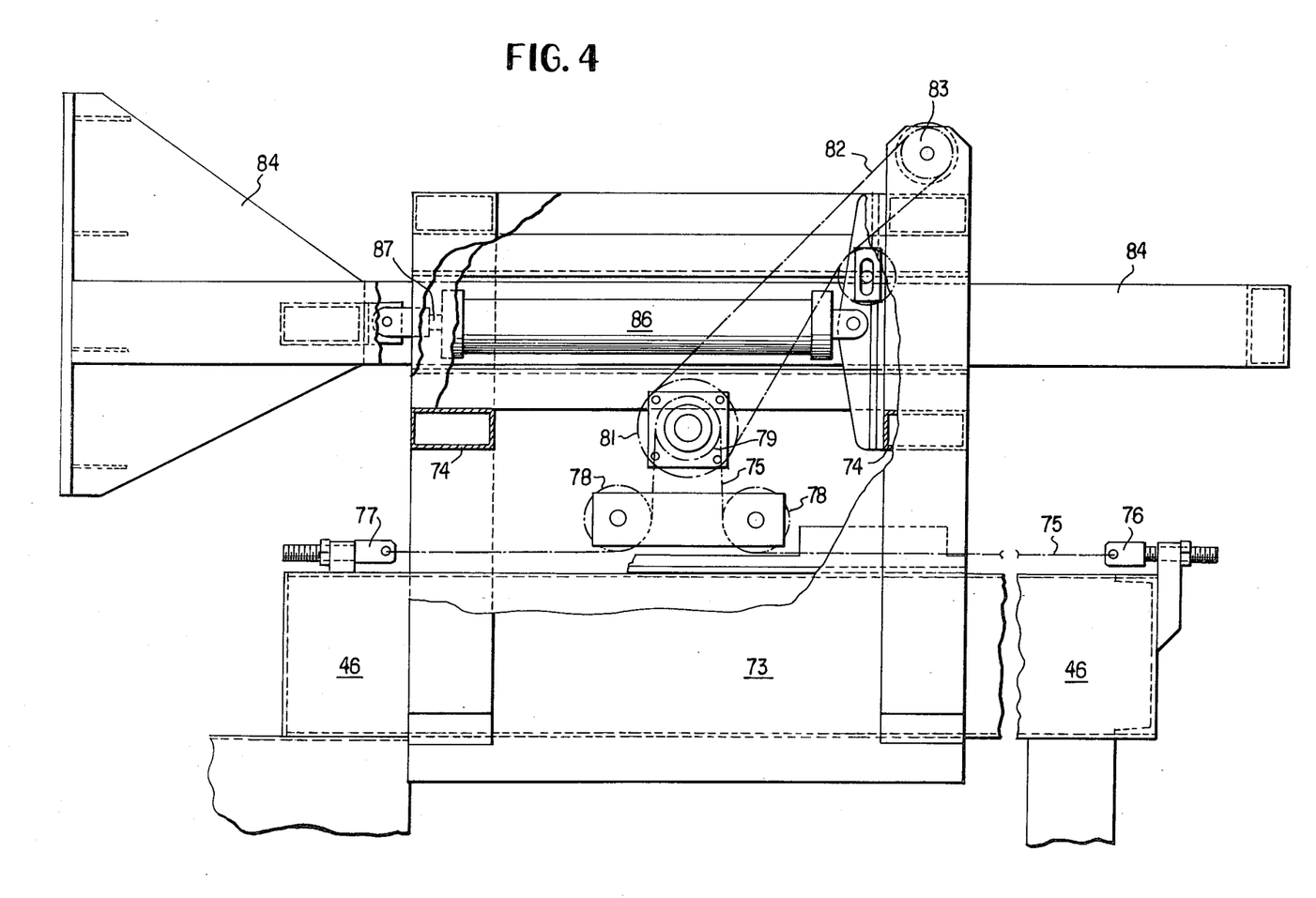
FIG. 4 is a elevational view, partly in section, of the first or squaring carriage according to the preferred embodiment of the invention.

Turning now to a more detailed description of the various components of the preferred embodiment of the apparatus according to the invention, the squaring or pusher carriage 12, as best shown in FIGS. 1 and 4, generally comprises a pair of vertical side members 72, 73 which are rigidly interconnected by transversly extending members 74, and which engage the side rails 46 and 48 respectively of the frame 44 of the conveyor table 10 in a manner so that the carriage 12 is supported on the side rails 46 and 48 and can slide along same in the direction of the longitudinal axis of the conveyor table 10. Although not clearly shown in the drawings, it is to be understood that each of the side members 72, 73 of the carriage 12 includes an inwardly directed flange which engages the bottom surface of the associated side rail 46 or 48 in a sliding manner so as to prevent lifting or tilting of the squaring carriage 12.

In order to controllably move the carriage 12 along the conveyor table 10 in a reversible manner toward any desired position, there is provided an arrangement including a link chain 75, which extends along the surface of the side rail 46 (FIG. 2) and is fastened at the two ends of same by means of anchoring arrangments 76, 77 as shown in FIG. 4. The chain 75 is engaged by a pair of sprocket wheels 78 which are rotatably mounted on the vertical side member 73 of the carriage 12. As shown in FIG. 4, each of the sprocket wheels 78 rests on the chain 75 which passes over a further sprocket wheel 79 disposed between and vertically above the sprocket wheels 78 and mounted on a rotatable horizontal shaft 80 which is journaled in the two vertical side members 72 and 73. Also mounted on the shaft 80 is a further sprocket wheel 81 which is engaged by a driven chain 82 driven by a reversible hydraulic motor 83 mounted on the carriage 12. With this arrangement, depending on the direction of rotation of the drive motor 83, the carriage 12 will be moved along the chain 75, and thus along the longitudinal axis of the conveyor table 10, either in the direction toward or away from the saw 18. It should be noted that although only one chain 75, extending along only one side rail 48, and its engaging components on the carriage 12 are shown, preferably a further similarly mounted chain extends along the other side rail 46 and is engaged by a further set of sprocket wheels 78–80 mounted on the associated vertical side member of the carriage 12.

Mounted on the carriage 12 for movement relative to same in a direction along the longitudinal axis of the conveyor table 10 and parallel to the surface of the conveyor table 10 is a slide carriage or squaring ram 84. The end of the slide carriage facing the saw 18 is provided with a metal plate 85 where surface is normal to the surface of the conveyor table 10 and whose area is at least equal to the cross-sectional area of the largest bundle of lumber 22 which can be handled by the apparatus. Movement of the slide carriage 84 relative to the carriage 12 is provided by means of a hydraulic cylinder 86 which is anchored to the carriage 12 and whose movable piston 87 is connected to the slide carriage 84. Consequently, extension of the piston 87 will move the slide carriage 84 relative to the carriage 12, and cause the surface of the plate 85 to the adjacent end of any material or bundle of lumber under pressure. To prevent movement of the carriage 12 during the time that the slide carriage 84 is extended under pressure, i.e., when the cylinder 86 is activated, the carriage 84 is preferably additionally provided with an arrangement (not shown) which can lock the carriage 12 in position to the frame 44. Such an arrangement could be, for example, a pair of cams pivotally mounted on the carriage 84 so that when pivoted they lockingly engage a respective one of the side rails 46 and 48 of the frame 44, and a hydraulic cylinder, likewise mounted on the carriage 12, whose piston is connected to the cams and pivots same into locking engagement with the side rails 46 and 48 when the cylinder is activated by the operator.

Figure 5:
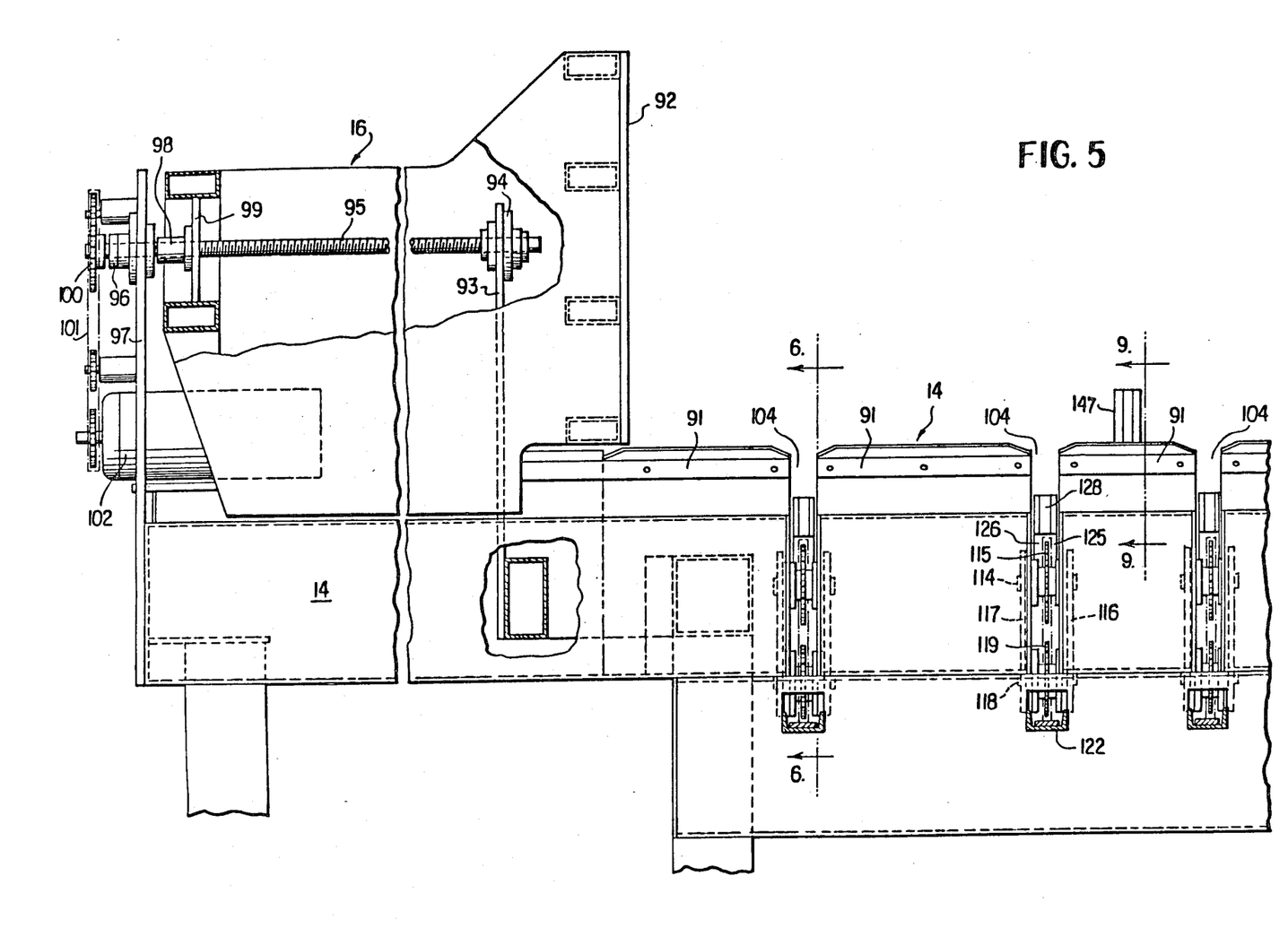
FIG. 5 is a elevation view, partly broken away, of the set works or second carriage and cutting table of the preferred embodiment of the invention.

Turning now to FIG. 5, there is shown a more detailed view of the cutting table 14 and the setworks carriage 16. The setworks carriage 16 is mounted on the cutting table 14 for longitudinal movement along the surface of same. In particular, the vertical sides of the setworks carriage 16 are provided with laterally inwardly extending flanges (not shown), which engage a respective horizontal slidebar 91 extending along each side of the cutting table 14. The end surface 92 of the setworks carriage 16 is a flat plate which extends normal to the surface of the cutting table 14 and has an area at least equal to the cross-sectional area of the largest bundle of lumber which can be handled by the apparatus. The end surface 92 serves to engage the leading end of the material or bundle of lumber being cut to act as a precision work-stop for same. Firmly supported on and connected to the frame or base of the cutting table 14 is a vertically extending bracket 93 which extends upwardly into the hollow interior of the setworks carriage 16. Mounted in the bracket 93 are pair of laterally spaced bearings 94 (only one of which is shown). One end of each of a pair of horizontal spaced precision Saginaw screwshafts 95 is mounted in a respective one of the bearings 94 in a manner so that it is free to rotate but is axially fixed. The opposite end of each of the screwshafts 95 is journaled in a respective bearing 96 mounted in a rigid vertical plate 97 fastened to the end of the cutting table 14. Threadingly engaged on each of the screwshafts 95 is a respective precision nut 98 which are each securely fastened to a vertical bracket 99 securely mounted on the setworks carriage 16. With this arrangement, rotation of the shafts 95 will, via the nuts 98, cause the carriage 16 to move along the surface of the cutting table, with the direction of movement being determined by the direction of rotation of the screwshaft 95. In order to rotate the screwshafts 95, the end of each of same protruding beyond the vertical plate 97 is provided with a gear 100 which is engaged by a chain 101 and driven by a motor 102. The actual control arrangement for accurately positioning the setworks carriage 16 via the drive motor 102 and for determining and indicating the actual position or distance of the end surface 92 of the setworks carriage 16 from the cutting plane of the saw 18 is of conventional design well-known in the art, and accordingly no further description of same is presented here. Moreover, although not shown, it is to be understood that the setwork carriage 16, like the carriage 12, is preferably provided with an arrangement for selectively locking the carriage 16 in a desired position to prevent any movement of same, particularly when the slide carriage 84 of the carriage 12 is extended. Such an arrangement can be, for example, a cam which is pivotally supported on the side rail of the cutting table 14 and positioned so that it can lockingly engage a horizontal bar mounted on the outer surface of side wall of the carriage 16, and a hydraulic cylinder, likewise supported on the side rail of the cutting table 14, for selectively pivoting the cam into engagement with the horizontal bar.

As indicated above, cut material located on the surface the cutting table 14 between the saw 18 and the surface 92 of the setworks carriage 16, e.g. a banded cut bunk of lumber, is to be removed from the surface of the cutting table in a direction transverse to the longitudinal axis of the cutting table 14 by means of a pusher mechanism 29. Since the cut material may substantially differ in length, a plurality of such pusher mechanisms 29, for example three pusher mechanisms 29 as shown in FIG. 2, are provided with each of the pusher mechanisms 29 extending laterally beyond both lateral edges of the cutting table 14. To accomodate the pusher mechanisms 29, as shown in FIG. 5, the cutting table 14 is provided with a plurality of sections of varying length in the portion thereof adjacent the saw 18 and one of the pusher mechanisms 29 is disposed in each of the channels or slots 104 formed between the respective sections of the sutting table 14. In FIG. 5, the pusher mechanisms 29 are each shown in their normal nonoperating or rest position wherein they are entirely located below the level of the surface of the cutting table 14. However, when transversely pushing material from the surface of the cutting table 14, two or more of the pusher mechanisms 29 are selectively raised so that the pusher elements extend above the level of the surface of the cutting table 14 and engage the cut material so as to push same across the surface of the cutting table 14. As can easily be appreciated, such a selective raising of the pusher mechanisms 29 is required since the setworks carriage 16 will be positioned on the cutting table 14 such that it covers one or more of the channels or slots 104 when a relatively small length of material is to be cut. The structure or functioning of the individual pusher mechanisms 29 will now be explained in detail with reference to FIGS. 5 and 6, with FIG. 6 showing a pusher mechanism 29 in its normal position in full line, and its raised position in dot-dash line.

Figure 6:
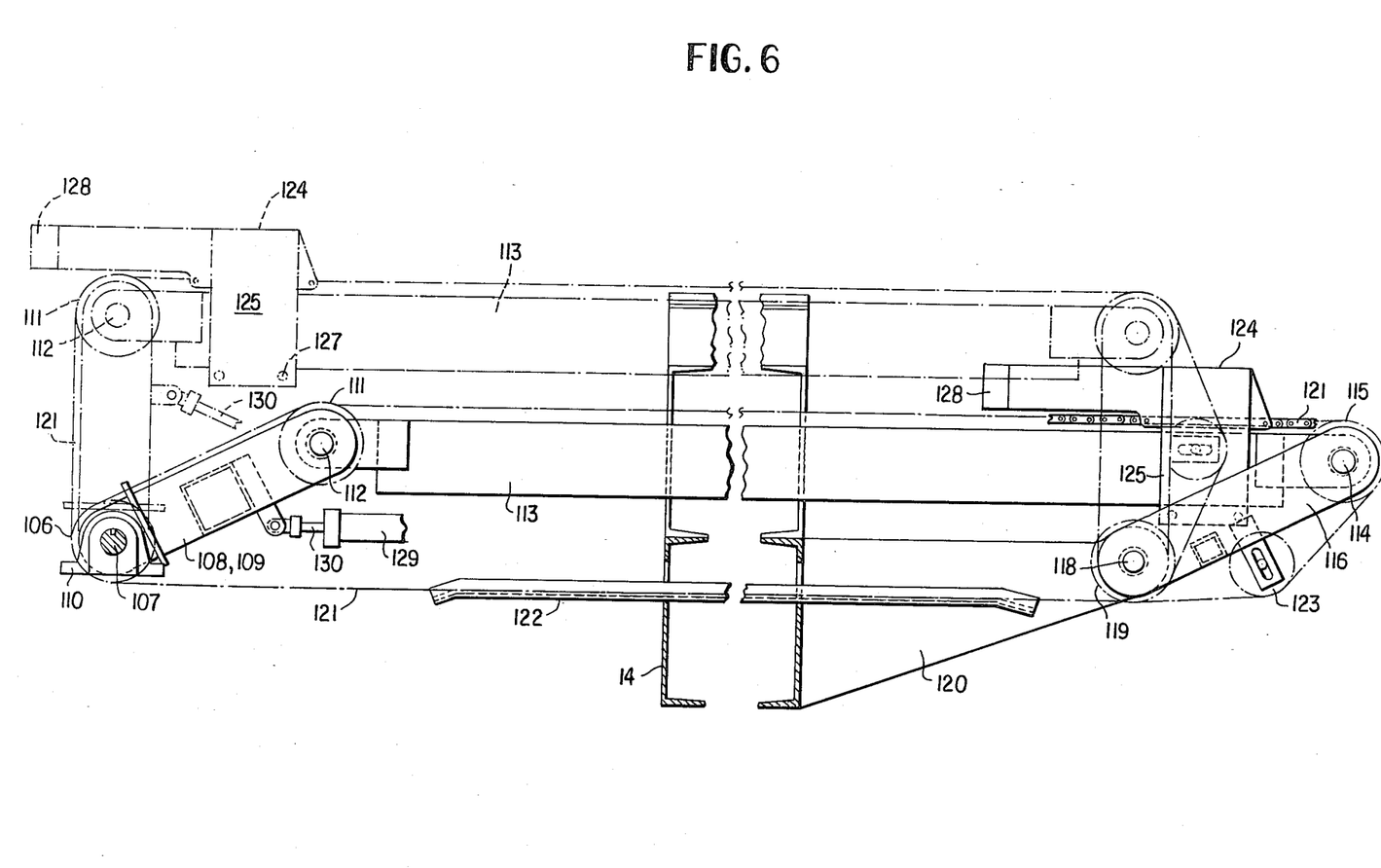
FIG. 6 is a sectional view along line 6—6 of FIG. 5 showing the mechanism for pushing the cut bundle of lumber from the cutting table.

Each of the pusher mechanisms 29 is a jump-chain arrangement and as shown in FIG. 6 includes a first sprocket wheel 106 which is mounted on a driven shaft 107 for rotation with the same, for example by keying the wheel 106 on the shaft 107. The shaft 107 is common to all of the pusher mechanisms 29 and consequently the respective driven sprocket wheels 106 are driven in common, both as to speed and direction, by the shaft 107 which is connected to a reversible electric motor (not shown). A pair of parallel-link members 108 and 109 are mounted, for example by means of suitable bearings, on the driven shaft 107 (or the support 110 for the shaft 107) on either side of the sprocket wheel 106 in a manner so that the links 108 and 109 are free to pivot about the axis of the shaft 107 but do not rotate with same. Disposed between the link members 108 and 109 at their opposite ends is a further sprocket wheel 111 which is rotatably mounted on a shaft 112 whose ends are suitably supported in the link members 108 and 109. Also supported on the shaft 112 by means of suitable bearings is a slide bar 113 which extends through the respective channel 104 in the cutting table 14 to the rear of same (as viewed in FIG. 2) and which has its other end supported, again by means of suitable bearings, on a shaft 114. The shaft 114, in turn, has a further sprocket wheel 115 rotatably mounted thereon and has its two ends suitably supported in a pair of parallel link members 116 and 117. The link members 116 and 117 are of the same length as the link members 108 and 109 and, like the link members 108 and 109, are mounted on a further shaft 118 by means of suitable bearings so that link members 116 and 117 can pivot about the axis of the shaft 118. The shaft 118 has a sprocket wheel 119 rotatably mounted thereon between the associated link members 116 and 117 and is supported on a bracket 120 which is rigidly fastened to the rear side frame of the cutting table 14.

Mounted on the four sprocket wheels 106, 111, 115 and 119 is an endless link-chain 121 whose lower reach is supported in a U-shaped channel 122. Proper tensioning of the link-chain 121 is provided by a further sprocket wheel 123 which is mounted on the link members 116, and 117 and whose lateral position relative to the edge of these link members is adjustable.

The actual pusher element for the pusher mechanism 29 essentially comprises a horizontal bar 124 which rests on the upper surface of the slide bar 113 and is provided with a groove in its lower surface so that it straddles the link chain 121 to which the bar 124 is fastened in a suitable manner. The horizontal bar 124 is likewise provided with a pair of vertically extending members 125 and 126 which straddle the slide bar 123 and are connected together at their lower ends, for example by means of bolts or screws 27 so that movement of the horizontal bar 124 is limited to movement along and parallel to the upper edge of the slide bar 123.

In the operation of the pusher mechanism thus far described, rotation of the driven shaft 107 in the counter-clockwise direction will result in the rotation of the link chain 121 of each of the pusher mechanisms 29 in a counter-clockwise direction and cause the respective pusher elements 124 to move from their normal or rest positions adjacent the link members 116 and 117 to the left as shown in FIG. 6 across the slide bar 113 until they reach a position adjacent the link members 108–109, as shown for example in dot-dash line for the raised position of the mechanism. At that time the direction of rotation of the shaft 107 is reversed, causing the pusher elements 124 to return to their initial normal positions.

As thus described, the movement of the pusher element 124 with the pusher mechanism 29 in the position shown in full line in FIG. 6, would not cause any engagement of the leading edge 128 of the element 124 with any material on the surface of the cutting table 14 since the travel of same is at all times below the surface of the cutting table 14. In order to cause selected ones of the pusher mechanisms 29 to engage any material on the surface of the cutting table 14, each of the pusher mechanisms 29 is provided with a hydraulic cylinder 129 having one end pivotally mounted on the frame (not shown) and its piston 130 pivotally connected to the link members 108 and 109. With this arrangement, extension of the piston 130 of a hydraulic cylinder 129 will cause the associated pusher mechanism 29 to move from the position shown in solid line to the position shown in dot-dash line so that the pusher element 124 will travel along a path above the surface of the cutting table and engage any material on the surface of same. It should be noted that the selected ones of the pusher mechanisms 29 are only maintained in the raised position during the travel of the pusher element 124 in the forward direction, i.e. from right to left as shown in FIG. 6, and all the pusher mechanisms 29 are maintained in the lowered position, i.e. by retraction of the piston 130, during the return travel of the pusher elements 124 to the initial or rest position.

Figure 7:
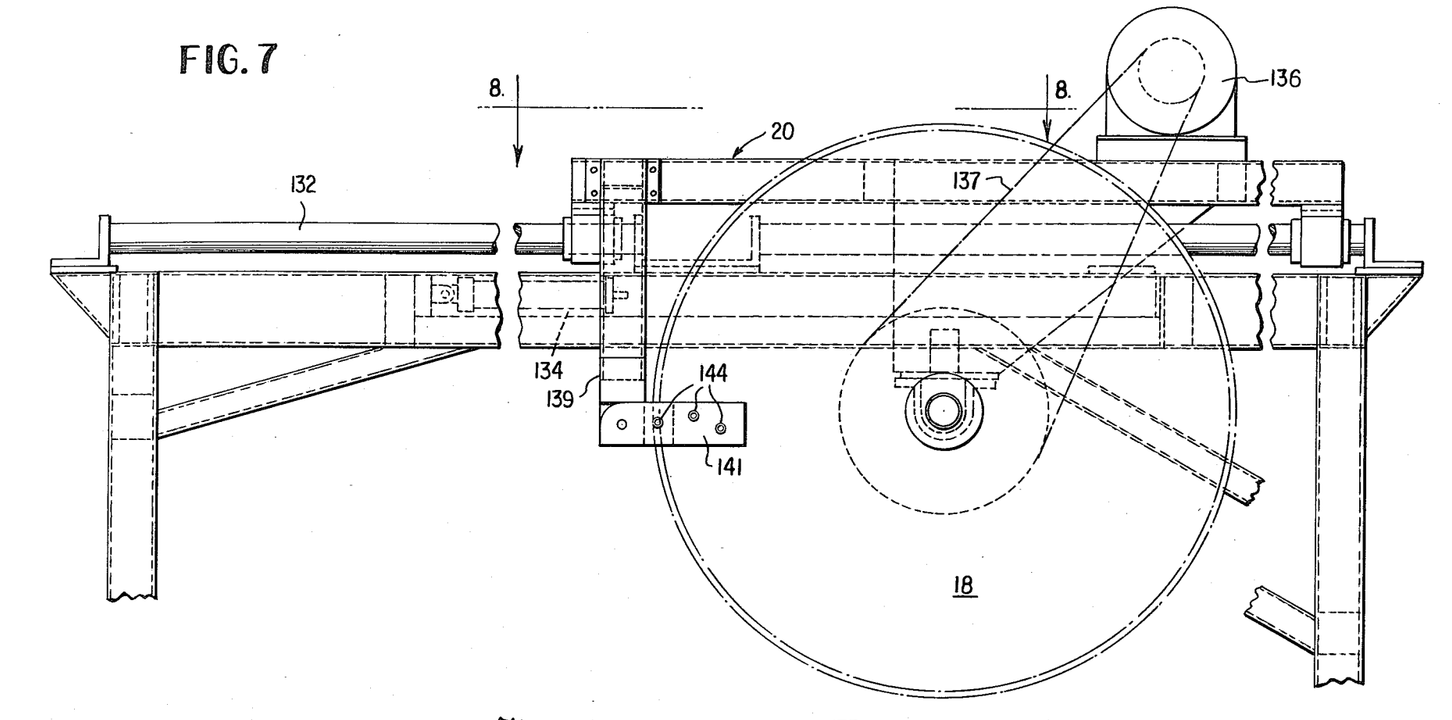
FIG. 7 is a side elevation of the saw carriage according to the preferred embodiment of the invention.
Figure 8:
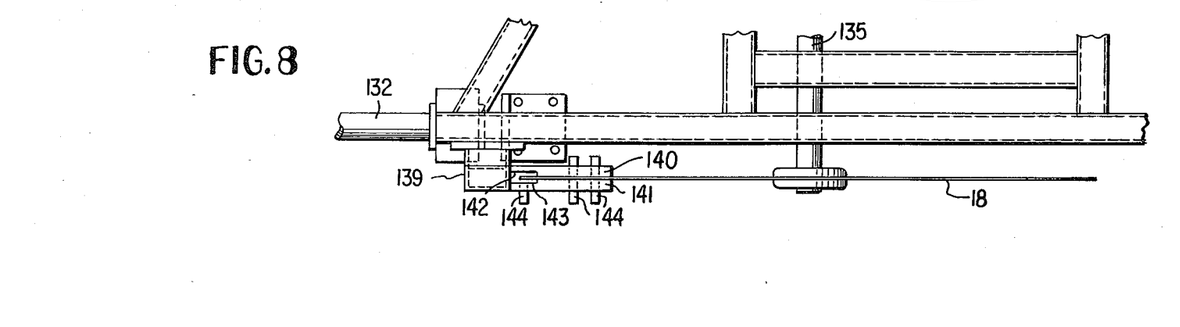
FIG. 8 is a sectional view along the line 8—8 of FIG. 7 showing the saw guide.

As mentioned above, the saw 18 is mounted on a saw carriage 20 so that it can move transverse to the direction of the longitudinal axis of the cutting table 14 and traverse same. As shown in FIGS. 2 and 7, the saw carriage 20 is generally supported so that it can slide along a pair of parallel spaced horizontal rod members 132 and 133. Transverse movement of the saw carriage 20 along the length of the members 132 and 133 is initially controlled by a hydraulic piston 134 extension of which causes the saw carriage 20 to move across the cutting table 14 by means of a conventional chain and pulley arrangement not shown in detail in the drawings. As shown, the saw 18 is mounted on a shaft 135 which is rotatably mounted on the carriage 20 by means of suitable bearings and which is driven by an electric motor 136 via a chain 137. Although the saw carriage 20 is provided with sufficient cross members 131 so as to support and maintain the circular saw blade 18 in a vertical plane, as is known there is a tendency for the cutting edge of a circular saw blade to wobble, particularly when a relatively large circular saw blade is used, as is preferably the case for an apparatus according to the present invention wherein the blade 18 may have a diameter of 78 inches. This results in problems when attempting to cut material, and particularly when attempts are made to accurately cut the material or bundle of lumber to a desired length. In order to avoid the wobbling of the circular sawblade 18, as shown in FIGS. 7 and 8, the sawblade 18 is provided with a guide, indicated generally by the reference numeral 138, for its leading edge so as to maintain the leading edge of the sawblade 18 in a vertical plane.

As shown, the sawguide 138 includes a vertical support member 139 which is rigidly fastened to the saw carriage 20 and extends downwardly slightly in front of the leading edge of the sawblade 18. Connected to the lower end of the support 139 are a pair of horizontally extending members 140 and 141 which straddle the leading edge of the sawblade 18 and which are positioned relative to one another so that only a slight clearance exists between the facing surfaces of the members 140 and 141 and the associated surfaces of the sawblade 18. Each of the horizontal members 140 and 141 is provided with a cutout 142 and 143 respectively so that, as shown, sufficient clearance is left between members 140 and 141 and the portion of the tip of the sawblade containing the sawteeth so as not to damage same. In this manner, the leading edge of the saw 18 will be maintained in the vertical plane as determined by the guide members 140 and 141, but without damage to the sawteeth. In order to cool the sawblade and at the same time provide a certain degree of lubrication for the guide arrangement, each of the members 140 and 141 is provided with fluid channels 144 through which water is directed under pressure against the surfaces of the sawblade 18.

As was pointed out above, during the cutting operation the original material or bundle of lumber 22 is supported in a lateral direction by stops 52 (FIGS. 1 and 3) on the side rail 46 of the conveyor table frame 44. However, since as likewise pointed out above, the cut material or portion of the bundle of lumber is to be removed from the surface of the cutting table 14 in a transverse direction by means of the pusher elements 29, it is not possible to extend the stops 52 along the edge of the cutting table 14. Accordingly, since such lateral support is desired for the portion of the material on the cutting table during the cutting operation, the preferred embodiment of the apparatus is provided with a pair of stops which can be selectedly raised during the cutting operation. For this purpose, as is shown in FIG. 2, the surface of the cutting table 14 is provided with two openings 145 and 146 which are adjacent its lateral edge and through which a respective stop, for example the stop 147 of FIG. 5, may be raised so as to provide lateral support for the material or portion of the bundle of lumber 22 disposed on the cutting table 14 between the plane of the saw 18 and the surface 92 of the setworks carriage 16. As shown in FIG. 9, the stop 147 is pivotally mounted on a support plate of the cutting table 14 so that it can be raised above or lowered beneath the surface of the cutting table 14. The raising and lowering of the stop 147 is controlled by a vertically oriented hydraulic piston 148 which is mounted on the side of the cutting table 14 and whose piston 149 is connected to the stop 147 via a link member 150.

Although, as pointed out above, the described apparatus may be used to cut various types of material into shorter lengths, the apparatus was particularly developed, and is particularly suited, for the cutting of bulk or bundles of mill length lumber into trimmed banded packages of lumber of desired shorter lengths, and accordingly the operation of the apparatus will be described for this purpose with reference to the various figures. Initially, a bundle of lumber 22, which may be banded adjacent its two ends, is placed on the surface of the conveyor table 10 by means of a forklift truck. From this point on, complete control of the operation of the apparatus can be carried out by a single operator via repective controls on the console 71 (FIG. 1). Initially, the setworks motor 102 is energized to cause the setworks carriage 16 to advance toward the cutting plane of the circular saw 18 until the leading end or material engaging surface 92 is positioned at a distance from the cutting plane of the circular saw 18 corresponding to a desired trimming cut which, for example, may be from one-eight of an inch to six inches. The motor is then deenergized and the locking arrangement for the set work carriage activated to lock same in position. Additionally, and if necessary, the drive motor 83 is energized to cause the squaring or pusher carriage 12 to advance along the link chain 75, and consequently along the longitudinal axis of the conveyor table 10, toward the saw 18 until its ram or material engaging surface 85 engages the trailing end of the bundle of lumber 22 and pushes the bundle of lumber 22 to a position opposite both of the crowder mechanisms 58 and 60. Thereafter, movement of the pusher or squaring carriage 12 is stopped and the hydraulic pistons 56 of the crowder mechanisms 58 and 60 are energized to cause the crowder mechanisms to push the bundle of lumber 22 transversely across the surface of the conveyor table 10 until the bundle of lumber abuts the stop 52. This transverse movement of the bundle of lumber 22 tends both to align or square the cross-section of the bundle of lumber and to properly align the bundle of lumber on the apparatus for subsequent banding and cutting. Thereafter, the drive motor 83 is again energized to cause the pusher carriage 12 to again advance toward the saw 18 and push the bundle of lumber 22 longitudinally along the conveyor table 10 until the leading edge of the bundle of lumber 22 engages surface 92 of the setworks carriage 16. At that time, movement of the pusher carriage 12 is stopped and the locking arrangement for the pusher carriage is activated to lock the pusher carriage 12 in a longitudinal position. The ends of the bundle of lumber 22 are then aligned by activating the hydraulic cylinder 86 to cause the ram 85 to be moved relative to the carriage 12, and under pressure, against the trailing end of the bundle of lumber 22. After alignment or squaring of the ends of the bundle of lumber 22 in this manner, the bander 68 is activated so as to tightly band the bundle of lumber 22, and thereafter the hydraulic piston 134 is activated to cause the saw carriage 20 and the driven saw 18 to traverse the cutting table 14 and trim the leading edge of the bundle of lumber 22. Prior to movement of the saw carriage 20, the setworks carriage 16 is preferably moved a short distance away from the cutting plane of the saw 18 in order not to impede the movement of the saw carriage 20 and to permit the short pieces of lumber trimmed from the bundle 22 to easily fall through an opening in the cutting table and onto the scrap conveyor 70 for transport to a scrap bin.

After this precission trimming operation, the setworks carriage 16 is then moved along the surface of the cutting table 14 until its surface 92 is a distance from the cutting plane of the saw 18 corresponding to the desired length of the bundle to be cut, and thereafter the pusher carriage 12 is advanced to push the bundle of lumber 22 along the surface of the conveyor table 10 and the cutting table 14 until the cut leading edge of the bundle of lumber 22 abuts the surface 92 of the setworks carriage 16. Then, the bander 68 is again energized to tightly band the bundle of lumber 22, and one or both of the stops 147 are raised, by activating the associated hydraulic pistons 148, to provide lateral support for the portion of the bundle of lumber between the surface 92 and the cutting plane of the saw 18. The saw carriage 20 is then again advanced to cause the saw 18 to cut the bundle of lumber 22, and thus separate a portion of precise length from same.

After cutting the bundle of lumber 22, and return of the saw carriage 20 to its initial position, the stop or stops 147 are retracted and the strapped cut bundle or bunk of lumber of precise length on the downstream side of the saw, i.e. adjacent the surface 92 of the setworks carriage 16, is removed from the surface of the cutting table 14 in a direction transverse to its longitudinal axis by means of the pusher mechanisms 29. This is achieved by initiating rotation of the driven shaft 107, causing each of the pusher elements 124 to advance along the surface of its respective slide bar 113, and by selectively energizing one or more of the pistons 129 to raise the associated pusher element 124 above the surface of the cutting table 124 so that its leading edge 128 can engage the banded bunk of lumber and move same transversely and eventually onto a pallet located on the surface of the pallet elevator 28.

The steps of advancing, bnading and cutting the bundle of lumber 22 and then removing the banded cut bank of lumber from the cutting table 14 are repeated sequentially until the entire bundle of lumber has been cut into banded bunks of lumber of desired length. Of course, at the time that the trailing edge of the original bundle of lumber 22 is in a position to be trimmed, the operation of the bander 68 is eliminated from the sequence. That is, after advancing the last portion of the bundle of lumber 22 onto the surface of the cutting table 14 and against the surface 92, the trailing edge of the bundle of lumber 22 is simply cut by advancing the saw carriage 20, without any immediately previous activation of the bander 68, and then the trimmed bunk of lumber is removed from the cutting table 14 by the pusher mechanisms 29. It should be noted that the position of the setworks carriage 16 may be moved prior to advancement of the bundle of lumber 22 between successive cutting operations if banded cut bunks of lumber of various lengths are desired.

It is to be understood that the above description of the present invention is susceptible to various modifications, changes and adaptations, and the same are intended to be comprehended within the meaning and range of equivalents of the appended claims.

What is claimed is:

1. In an apparatus for precision trimming and/or precision cutting bulk elongated material into desired lengths comprising:
    (a) an elongated infeed conveyor table for supporting the material to be trimmed and cut and for conveying such material along a path extending longitudinally of same;
    (b) an elongated cutting table disposed adjacent one end of said conveyor table for receiving and supporting material being conveyed along said path;
    (c) power cutting means located adjacent said cutting table, said cutting means including a circular saw mounted for rotation about a substantially horizontal axis on a moveable saw carrier, said saw carriage being operable to move said circular saw across said path to cut the material on said cutting table;
    (d) a first substantially horizontal carriage mounted on said conveyor table for controlled reversible movement along said path, said carriage having a first material engaging surface extending across and substantially normal to said path for engaging one end of the material to push same along said conveyor toward said cutting table; and
    (e) a second substantially horizontal carriage mounted on said cutting table for controlled reversible movement along said path on the downstream side of said circular saw, said second carriage having a further material engaging surface extending across and substantially normal to said path for engaging the opposite end of said material to act as a stop for material moving along said path to permit cutting of, the material at a desired point; the improvement wherein:
    the elongated material is a strapped bundle of lumber which is to be precision trimmed and cut into a plurality of bundles of shorter length; and
    said first carriage includes means for substantially aligning the ends of a bundle of lumber on said conveyor, said aligning means including means for mounting said first material engaging surface on said first carriage so that it is moveable, relative to said first carriage, along said path in a reversible manner, and a controllable piston connected between said first material engaging surface and the front of said first carriage for selectively and controllably exerting pressure on said first material engaging surface to move same relative to said first carriage and under pressure against the adjacent end of a bundle of lumber.

2. The apparatus defined in claim 1 further comprising means for removing the cut length of material between the plane of said circular saw and said second material engaging surface from the surface of said cutting table.

3. The apparatus defined in claim 2 wherein said removing means includes means for pushing said cut length of material from said cutting table in a substantially horizontal direction transverse to said path.

4. The apparatus defined in claim 3 wherein said means for pushing includes a plurality of pusher elements mounted in said cutting table and normally disposed below said material supporting surface of same, means for selectively and controllably raising desired ones of said pusher elements above the surface of said cutting table adjacent one side of same so that they bear against one side of the material to be moved, and further means for moving such pusher elements across the surface of said cutting table in a direction transverse to said path.

5. The apparatus defined in claim 4 further comprising a plurality of raisable stops mounted in said cutting table along the side of said opposite that at which said pusher elements appear when initially raised, said stop means being raised to prevent transverse movement of said material during the cutting of same and lowered during movement of said material over said surface of said cutting table.

6. The apparatus of claim 1 further comprising means for aligning the cross-section of a strapped bundle of lumber placed on said conveyor, said cross-section aligning means including at least one upward vertically extending stop disposed along one edge of said conveyor table and at least one crowder disposed along the opposite edge of said conveyor table, said crowder including a vertically extending bar and means, including a piston, for moving said bar under pressure partially across the surface of said conveyor table in a direction transverse to the longitudinal axis and toward said one edge of said conveyor table, whereby a bundle of lumber on said conveyor table will be moved against said stop by said transversely moving vertical bar and cause the vertical edges of such bundle to be aligned between said stop and said bar.

7. The apparatus defined in claim 1, further comprising strapping means disposed adjacent the upstream side of said circular saw for tightly strapping a bundle of lumber prior to cutting same with said saw.

8. A method of precision cutting a strapped bundle of lumber into at least one trimmed precision bundle of lumber of a shorter length using the apparatus of claim 7 comprising the steps of:
   (a) placing a strapped bundle of lumber on said conveyor table between said saw and said first carriage;
   (b) moving said second carriage toward said saw until said second material engaging surface is a first desired distance from said saw;
   (c) moving said first carriage toward said saw until the leading edge of the bundle of lumber abuts said second material engaging surface;
   (d) aligning the ends of said bundle of lumber by moving said first material engaging surface relative to said carriage and toward said saw under pressure;
   (e) tightly strapping said bundle of lumber with said strapping means; and
   (f) advancing said saw carriage to cause said saw to precision cut said lumber.

9. The method defined in claim 8 where in said first desired distance is that corresponding to a trimming cut and wherein said method further comprises the following steps after step (e):
   (f) moving said second carriage until said second material handling surface is a desired distance from said saw corresponding to the desired length of a cut bundle;
   (g) advancing said first carriage toward said saw until the cut leading edge of said bundle abuts said second material engaging surface;
   (h) tightly strapping the remaining length of said bundle at said location adjacent said saw.
   (i) advancing said saw carriage to cause said saw to precision cut said bundle of lumber;
   (j) removing the strapped cut bundle of lumber on the downstream side of the saw from the cutting table in a direction transverse to the longitudinal axis of same; and
   (k) repeating said steps (g) to (j) as necessary until the original bundle of lumber has been precision cut into the desired number of strapped bundles of desired shorter length.

10. The method defined in claim 8 or 9 further comprising the step of aligning the cross-section of said bundle of lumber after said step (a) and before said step (c).

11. The method defined in claim 8 or 9 further comprising moving said second carriage in a direction away from said saw after said step (d) and prior to said step (f).

12. The apparatus defined in claim 1 further comprising guide means mounted on said saw carriage for guiding and cooling said saw blade, said guide means including a pair of guide blocks, means for mounting said guide blocks in a fixed horizontal position adjacent the leading edge of said saw and so that said guide block symetrically straddle the cutting edge of said saw, and means, including a fluid channel extending through said guide blocks for directing fluid under pressure against the side surfaces of said saw to cool same and to maintain at least the leading edge of same in a desired plane.

13. The apparatus defined in claim 1 wherein said second carriage is moveable to desired distances from the plane of said saw to determine the length of the cut bundles of lumber.

14. Apparatus for precision trimming and/or precision cutting bulk elongated material into desired lengths comprising in combination:
   (a) an elongated infeed conveyor table for supporting the material to be trimmed and cut and for conveying such material along a path extending longitudinally of same;
   (b) an elongated cutting table disposed adjacent one end of said conveyor table for receiving and supporting material being conveyed along said path;
   (c) power cutting means located adjacent said cutting table, said cutting means including a circular saw mounted for rotation about a substantially horizontal axis on a moveable saw carriage, said saw carriage being operable to move said circular saw across said path to cut the material on said cutting table;
   (d) a first substantially horizontal carriage mounted on said conveyor table for controlled reversible movement along said path, said carriage having a first material engaging surface extending across and substantially normal to said path for engaging one end of the material to push same along said conveyor toward said cutting table;
   (e) a second substantially horizontal carriage mounted on said cutting table for controlled reversible movement along said path on the downstream side of said circular saw, said second carriage having a further material engaging surface extending across and substantially normal to said path for engaging the opposite end of said material to act as a stop for material moving along said path to permit cutting of the material at a desired point; and
   (f) means for pushing the cut length of material between the plane of said circular saw and said second material engaging surface from the surface of said cutting table in a substantially horizontal direction transverse to said path, said means for pushing including a plurality of pusher elements mounted in said cutting table and normally disposed below said material supporting surface of same, means for selectively and controllably raising desired ones of said pusher elements above the surface of said cutting table adjacent one side of same so that they bear against one side of the material to be moved, and further means for moving such pusher elements across the surface of said cutting table in a direction transverse to said path.

15. The apparatus defined in claim 14 further comprising a plurality of raisable stops mounted in said cutting table along the side of same opposite that at which said pusher elements appear when initially raised, said stop means being raised to prevent transverse movement of said material during the cutting of same and lowered during movement of said material over said surface of said cutting table.

* * * * *